(12) United States Patent
Hager et al.

(10) Patent No.: US 6,744,401 B2
(45) Date of Patent: Jun. 1, 2004

(54) METHODS AND APPARATUS FOR RADAR DATA PROCESSING

(75) Inventors: James R. Hager, Golden Valley, MN (US); Jason I. Formo, Brooklyn Park, MN (US); Jens M. Henrickson, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/144,881

(22) Filed: May 13, 2002

(65) Prior Publication Data

US 2003/0210181 A1 Nov. 13, 2003

(51) Int. Cl.[7] .............................. G01S 7/40; G01S 7/28; G01S 7/285
(52) U.S. Cl. ........................... 342/173; 342/25; 342/61; 342/62; 342/63; 342/64; 342/65; 342/118; 342/120; 342/147; 342/156; 342/175; 342/194; 342/195; 342/357.01; 342/357.06
(58) Field of Search .............................. 342/25, 61, 62, 342/63, 64, 65, 165–175, 190, 197, 357.01–357.17, 89, 98, 102, 103, 107, 118, 120, 127, 145, 146–158, 417, 422, 423–427, 442–446; 701/200, 207, 213–216, 220, 221, 223

(56) References Cited

U.S. PATENT DOCUMENTS

| 4,164,036 A | 8/1979 | Wax |
| 4,310,894 A | 1/1982 | Lee et al. |
| 4,328,495 A | 5/1982 | Thue |
| 4,553,221 A | 11/1985 | Hyatt |
| 4,684,950 A | 8/1987 | Long |
| 4,851,852 A | 7/1989 | Bjorke et al. |
| 5,107,268 A | 4/1992 | Sturm et al. |
| 5,140,331 A | 8/1992 | Aulenbacher et al. |

(List continued on next page.)

FOREIGN PATENT DOCUMENTS

GB     2213339 A  *  8/1989  ............. G01S/5/10

OTHER PUBLICATIONS

Narayan A. Acharya et al., "Intelligent FDI Management in the Adaptive Tactical Navigator", IEEE; Nov. 29, 1988; pp. 120–125; The Analytic Sciences Corporation, Reading, MA.

Primary Examiner—Bernarr E. Gregory
(74) Attorney, Agent, or Firm—Matthew Luxton, Esq.; Armstrong Teasdale LLP

(57) ABSTRACT

A method for testing a radar system utilizing flight test radar data is described. The method includes time synchronizing measured radar data with a GPS based time marker, storing at least a portion of the time synchronized radar data, storing the GPS data, processing the stored GPS data to correspond with a physical position of an antenna which received the radar data, providing a radar model, and comparing the processed radar model data to the stored radar data.

19 Claims, 7 Drawing Sheets

U.S. PATENT DOCUMENTS

| | | |
|---|---|---|
| 5,150,125 A | 9/1992 | Hager |
| 5,173,706 A | 12/1992 | Urkowitz |
| 5,264,853 A | 11/1993 | Sturm et al. |
| 5,309,161 A | 5/1994 | Urkowitz et al. |
| 5,389,931 A | 2/1995 | Anderson et al. |
| 5,432,520 A | 7/1995 | Schneider et al. |
| 5,477,226 A | 12/1995 | Hager et al. |
| 5,485,157 A | 1/1996 | Long |
| 5,589,833 A | 12/1996 | Randall et al. |
| 5,646,857 A | 7/1997 | McBurney et al. |
| 5,867,119 A | 2/1999 | Corrubia et al. |
| 5,892,462 A | 4/1999 | Tran |
| 5,945,926 A | 8/1999 | Ammar et al. |
| 5,952,961 A | 9/1999 | Denninger |
| 5,969,667 A | 10/1999 | Farmer et al. |
| 6,011,505 A | 1/2000 | Poehler et al. |
| 6,025,800 A | 2/2000 | Hager |
| 6,125,155 A | 9/2000 | Lesthievent et al. |
| 6,148,195 A | 11/2000 | Schuchman et al. |
| 6,232,910 B1 | 5/2001 | Bell et al. |
| 6,233,522 B1 * | 5/2001 | Morici ........................ 342/64 |
| 6,260,052 B1 | 7/2001 | Song |
| 6,297,764 B1 | 10/2001 | Wormington et al. |
| 6,337,888 B1 | 1/2002 | Huang et al. |
| 6,362,775 B1 | 3/2002 | Geobel et al. |
| 6,362,776 B1 | 3/2002 | Hager et al. |
| 6,507,289 B1 | 1/2003 | Johnson et al. |

\* cited by examiner

METHODS AND APPARATUS FOR RADAR DATA PROCESSING

BACKGROUND OF THE INVENTION

This invention relates generally to testing of radar systems, and more specifically to a radar testing system which is capable of synchronizing radar data with global positioning satellite (GPS) data and digital elevation map (DEM) data to determine an accuracy of the radar.

The proper navigation of an aircraft in all phases of its flight is based to a large extent upon the ability to determine the terrain and position over which the aircraft is passing. In this regard, instrumentation, such as radar systems, and altimeters in combination with the use of accurate electronic terrain maps, which provide the height of objects on a map, aid in the flight path of the aircraft. Electronic terrain maps are well known and are presently used to assist in the navigation of aircraft.

Pulse radar altimeters demonstrate superior altitude accuracy due to their inherent leading edge return signal tracking capability. The pulse radar altimeter transmits a pulse of radio frequency (RF) energy, and a return echo is received and tracked using a tracking system. The interval of time between signal bursts of a radar system is called the pulse repetition interval (PRI). The frequency of bursts is called the pulse repetition frequency (PRF) and is the reciprocal of PRI.

FIG. 1 shows an aircraft 2 with the Doppler effect illustrated by isodops as a result of selection by the use of Doppler filters. The area between the isodops of the Doppler configuration will be referred to as swaths. The Doppler filter, and resulting isodops are well known in this area of technology and will not be explained in any further detail. Further, the aircraft 2 in the specification will be assumed to have a vertical velocity of zero. As is known, if a vertical velocity exists, the median 8 of the Doppler effect will shift depending on the vertical velocity. If the aircraft 2 has a vertical velocity in a downward direction, the median of the Doppler would shift to the right of the Figure. If the aircraft 2 has a vertical velocity in an upward direction, the Doppler would shift to the left of the Figure. Again, it will be assumed in the entirety of the specification that the vertical velocity is zero for the ease of description. However, it is known that a vertical velocity almost always exists.

Radar illuminates a ground patch bounded by the antenna beam 10 from an aircraft 2. FIG. 1a shows a top view of the beam 10 along with the Doppler effect and FIG. 1b shows the transmission of the beam 10 from a side view. To scan a particular area, range gates are used to further partition the swath created by the Doppler filter. To scan a certain Doppler swath, many radar range gates operate in parallel. With the range to each partitioned area determined, a record is generated representing the contour of the terrain below the flight path. The electronic maps are used with the contour recording to determine the aircraft's position on the electronic map. This system is extremely complex with all the components involved as well as the number of multiple range gates that are required to cover a terrain area. As a result, the computations required for this system are very extensive.

In addition to the complexity, the precision and accuracy of the distance to a particular ground area or object has never been attained using an airborne radar processor.

BRIEF SUMMARY OF THE INVENTION

In one aspect, a method for testing a radar system utilizing flight test radar data is provided. The method comprises time synchronizing measured radar data with a GPS based time marker, storing at least a portion of the time synchronized radar data, and storing the GPS data. The method further comprises processing the stored GPS data to correspond with a physical position of an antenna which received the radar data, providing a radar model and comparing the processed radar model data to the stored radar data.

In another aspect, a radar data recording and processing system is provided. The system comprises an aircraft GPS which is configured to provide at least one time mark signal and at least one timing count signal, a memory device, and a data formatter. The data formatter is configured to digitize samples of radar data, time synchronize the digitized radar data with GPS data using the time mark signal and the timing count signal, generate control words relating to the radar data, the time mark signal, and the timing count signal, and place the controls words and radar data in a data stream for storage in said memory device.

DETAILED DESCRIPTION OF THE INVENTION

Figure 1A:
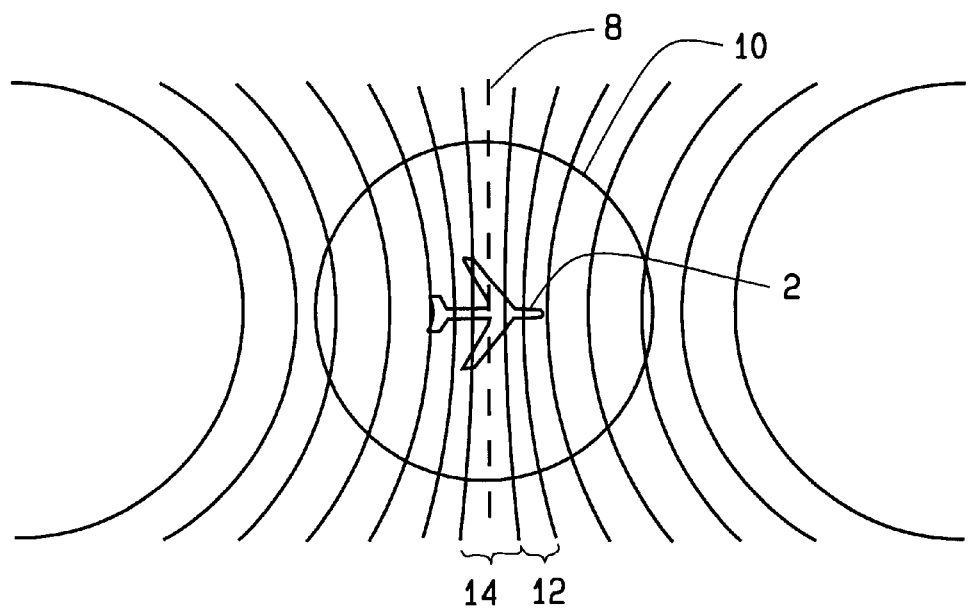
FIG. 1a is a diagram illustrating swaths made by a radar.
Figure 1B:
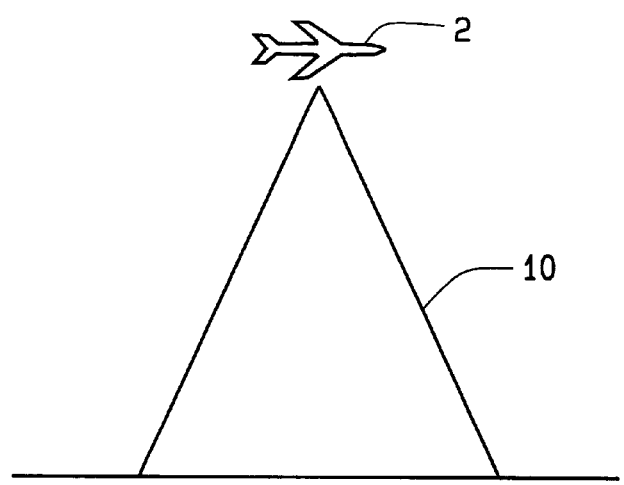
FIG. 1b is a diagram illustrating a radar transmit pattern.

There is herein described a combination Doppler radar/interferometer to navigate an aircraft 2 with respect to terrain features below aircraft 2. As used herein, aircraft is used to identify all flight platforms which may incorporate a radar system, including, but not limited to, jets, airplanes, unmanned aerial vehicles, missiles, and guided weapons. The radar also functions with an electronic map, sometimes referred to herein as a digital elevation map (DEM), in determining a position of aircraft 2. In addition to determining an altitude of aircraft 2, an XYZ location of the nearest object to aircraft 2 on the ground, with respect to aircraft 2 in a certain terrain area can be determined. As aircraft 2 is flying over terrain as shown in FIGS. 1a and 1b, it is important to determine a position of aircraft 2 in accordance with a map. A Doppler filter and range gate are used with a transmitted beam 10 from a transmit antenna.

Figure 2:
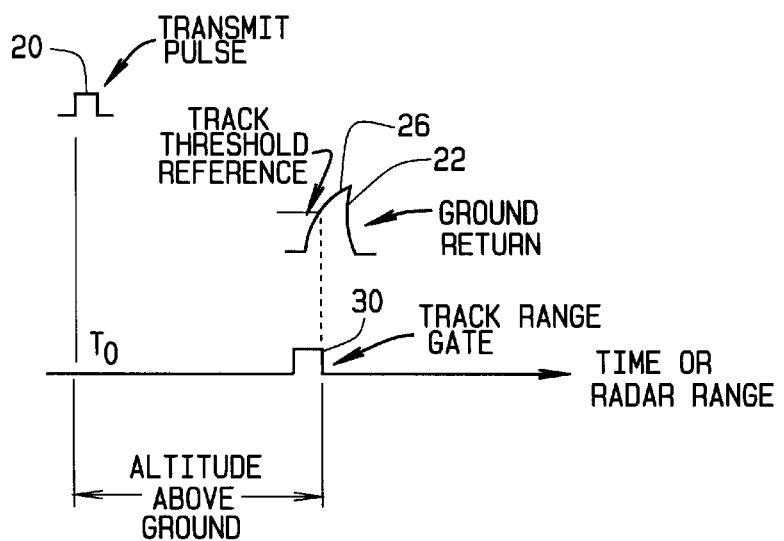
FIG. 2 is an illustration of radar signal waveforms over time.

In a general altitude range tracking radar, range is measured and indicated by measuring the time for transmitted energy to be reflected from the surface and returned. With reference to FIG. 2, a radar transmitter repeatedly sends out bursts of electromagnetic energy at a predetermined repetition rate from an antenna, as indicated by transmit pulse 20. Following a time delay which is a function of the aircraft altitude, a ground return pulse 22 is received by a receiving antenna feeding a receiver. A range gate 30 is utilized by the tracking radar to view at least a portion of ground return 22.

Figure 3:
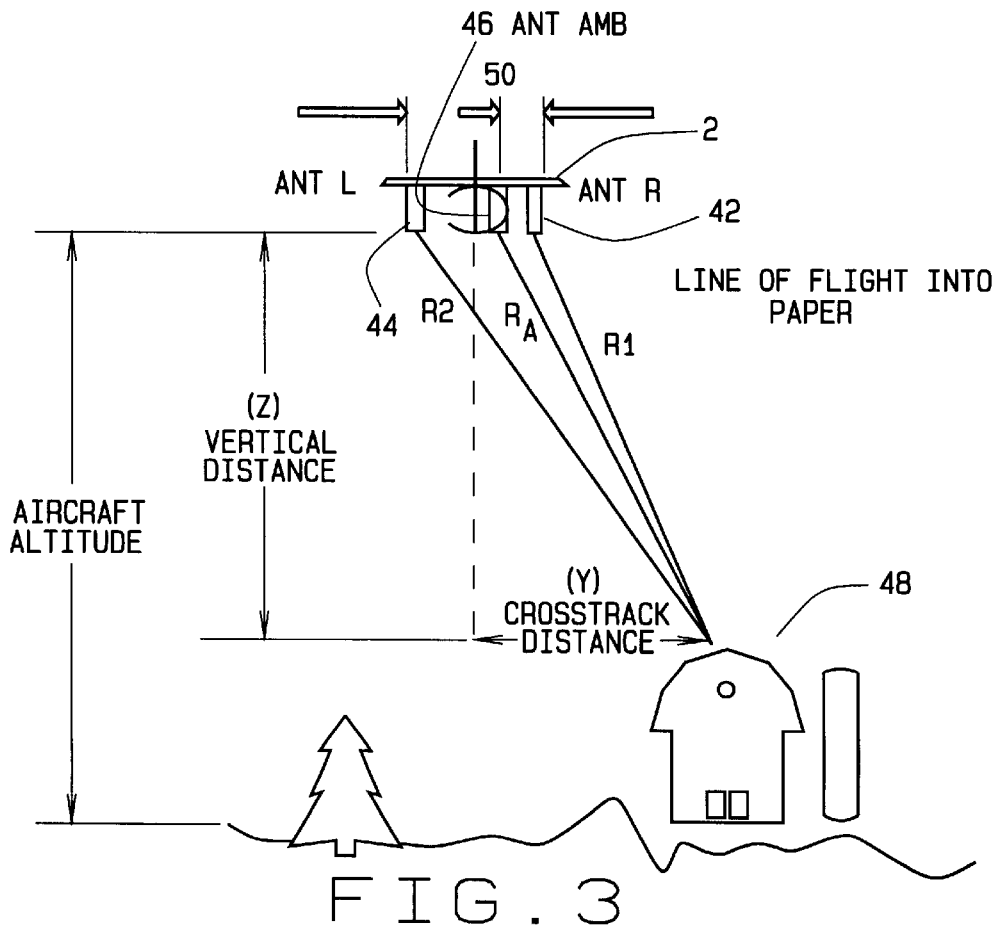
FIG. 3 is a diagram illustrating radar signals being received by three antennas.

Referring to FIG. 3, three receive antennas, antenna R (right) 42, Antenna L (left) 44, and an ambiguous antenna (Ant Amb) 46, are used to receive information. Along with the three antennas, three processing channels, referred to below as left, right and ambiguous respectively, each include a receiver, a data acquisition device, range gate, and a filter. Use of the three antenna system, along with the processing described herein, provides a solution to ambiguous detected angle of the nearest object. The ambiguous detected angle is due to the spacing of the antennas being greater than the transmitted RF frequency wavelength. By receiving three returns, the processing system is able to determine an umambiguous location of the nearest object on the ground, which in turn is utilized to locate position of aircraft 2 in body coordinates. Body coordinates are typically preferable than positioning as determined by known systems, as those systems determine position as if the body aircraft 2 is aligned with the line of flight. As aircraft 2 is prone to pitch, roll, and yaw, the body of aircraft 2 is not necessarily aligned with the line of flight.

In an exemplary illustration, antenna R 42, along with processing systems (described below) will provide a course range search which roughly determines the range to the nearest point 48 in swath 12 (shown in FIG. 1) before aircraft 2 has passed over from swath 14 into swath 12. Determination of the nearest point 48 is performed by a wide bandwidth, high speed track loop which quickly determines the range to nearest point 48 in swath area 12. Nearest point 48 provides a starting point for a tracking loop using antenna L 44 and ambiguous antenna 46. The track loop controls the range gate to track returns from a transmit antenna. A narrow bandwidth, high precision processor is used to set range gates for antenna L 44 and ambiguous antenna 46 to an exact range of nearest point 48 based on the previous course range determination. The operation of the three receive antennas and associated processing channels provides a quick and accurate setting of a range gate on the nearest object in the Doppler swath 14 directly below aircraft 2 so that a phase difference can be measured and along with the known separations 50 amongst the three antennas, a crosstrack distance to the object 48 is determined. The crosstrack distance is the distance, horizontal and perpendicular to the body coordinates of aircraft 2, to object 48.

FIG. 3 shows a view with aircraft 2 going into the Figure. During the phase comparison portion of the time interval, the Doppler filters of the left, right and ambiguous channels are set to select a swath 14 (shown in FIG. 1) below aircraft 2. Further, both range gates are set at a range directly on the nearest object 48 as previously determined. From this range, antenna R 42 receives a signal from object 48 at a distance of R1, ambiguous antenna 46 receives a signal from the object 48 at a distance of RA, and antenna L 44 receives the signal from object 48 at a distance of R2 where the distance difference is a function of the antenna separation 50 between and amongst the three antennas. A phase processor (described below) compares the phase difference between R1 and RA, R2 and RA, and R1 and R2 once the return signals are received. As illustrated in the Figure, the exact range differences (R2–R1), (RA–R1), and (R2–RA) are from phase differences and simple trigonometry relations are used to determine the exact crosstrack distance to the object 48 in aircraft body coordinates.

As illustrated in FIG. 3, after the range differences (R2–R1), (RA–R1), and (R2–RA) are determined and knowing the antenna separations 50, and measured range R1, then the crosstrack distance (Y) and vertical distance (Z) can also be computed in aircraft body coordinates. It is important that the precise location of nearest object 48 in each swath is determined so correlation can be made with the electronic maps which will accurately locate the aircraft 2 on the electronic map. For example, at typical high speed aircraft cruising velocities, a radar, configured with reasonably sized Doppler filters, has swath widths of approximately 10 feet at 5000 feet altitude. The resulting incidence angle formed by the intersection of R1 and a vertical line 27 will then be on the order of less than 3 degrees. Basic trigonometry relations show that even with a typical error (for example 1%) on the radar range gate measured distance R1, (50 feet at 5000 feet altitude), knowing the precise antenna separation 50, and precise range differences (R2–R1), (RA–R1), and (R2–RA), the crosstrack distance (Y) will be precise due to the very small incidence angle encountered.

Figure 4:
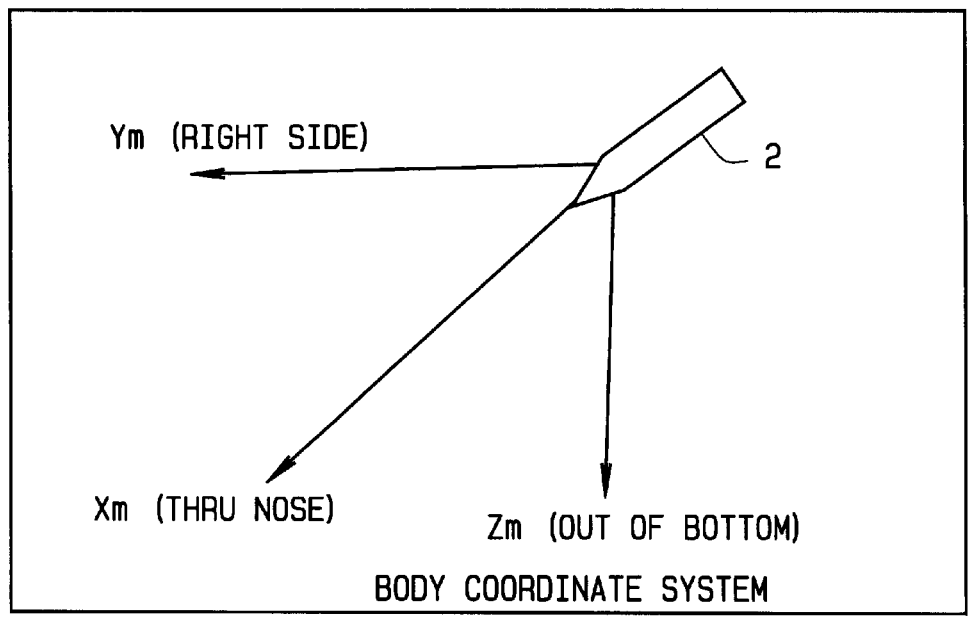
FIG. 4 is a diagram illustrating a body coordinate system.

FIG. 4 illustrates a body coordinate system. The body coordinate system, is the coordinate system with respect to aircraft body 2. An x-axis, Xm is an axis which passes through a nose of aircraft body 2. A y-axis, Ym, is an axis which is 90 degrees from Xm and is positive to the right of aircraft body 2. A z-axis, Zm, is an axis which is 90 degrees from both Xm and Ym and perpendicular to a bottom of aircraft body 2. With respect to aircraft maneuvering, a positive roll is a drop of the right wing, a positive pitch is a nose up, and a positive yaw is the nose to the right, all with respect to a line of flight.

Figure 5:
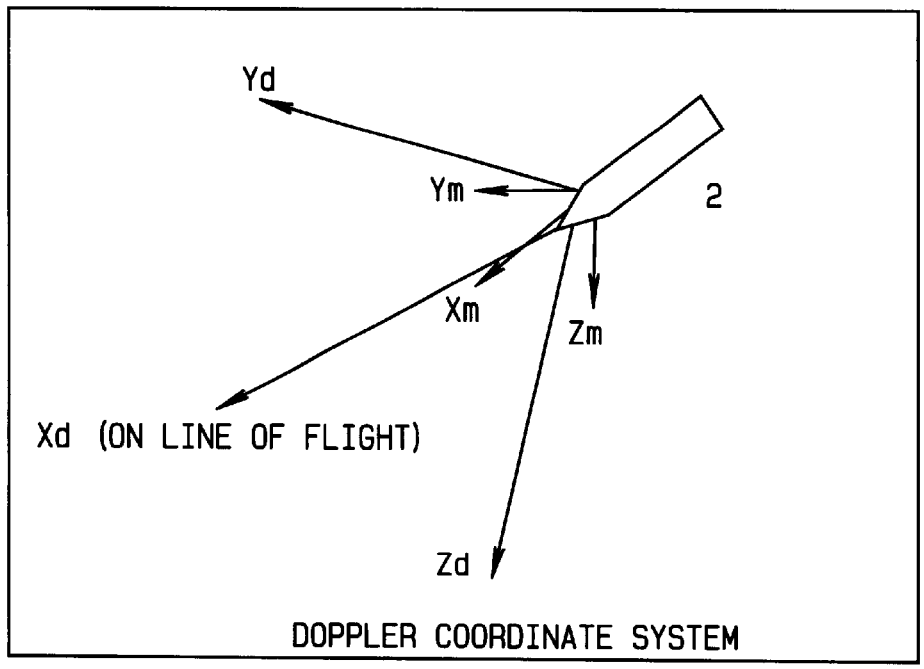
FIG. 5 is a diagram illustrating a doppler coordinate system with respect to the body coordinate system of FIG. 4.

It is known that aircraft do not typically fly in alignment with the aircraft body coordinates. Such a flight path is sometimes referred to as a line of flight. Therefore an aircraft which is flying with one or more of a pitch, roll, or yaw, and which has a hard mounted radar system, introduces an error element in a determination of target location, in body coordinates. As such radars typically operate with respect to the line of flight, a coordinate system with respect to the line of flight has been developed and is sometimes referred to as a doppler coordinate system. FIG. 5 illustrates differences between aircraft coordinates and doppler coordinates. An x-axis of the doppler coordinate system, Xd, is on the line of flight. A y-axis, Yd, and a z-axis, Zd, at right angles to Xd, respectively are defined as across Xd, and above and below Xd.

Therefore, if aircraft 2 is flying with no pitch, roll, or yaw, the body coordinate system aligns with the doppler coordinate system. For a positive roll, Xm and Xd are still aligned, while Yd rotates below Ym and Zd rotates to the left of Zm. For a positive yaw, Xd rotates to the right of Xm, Yd rotates behind Ym, and Zd and Zm are aligned. For a positive pitch, Xd rotates above Xm, Yd aligns with Ym, and Zd rotates ahead of Zm. The complexity of having multiple of pitch, roll, and yaw, and determining a target position in aircraft body coordinates is apparent.

Figure 6:
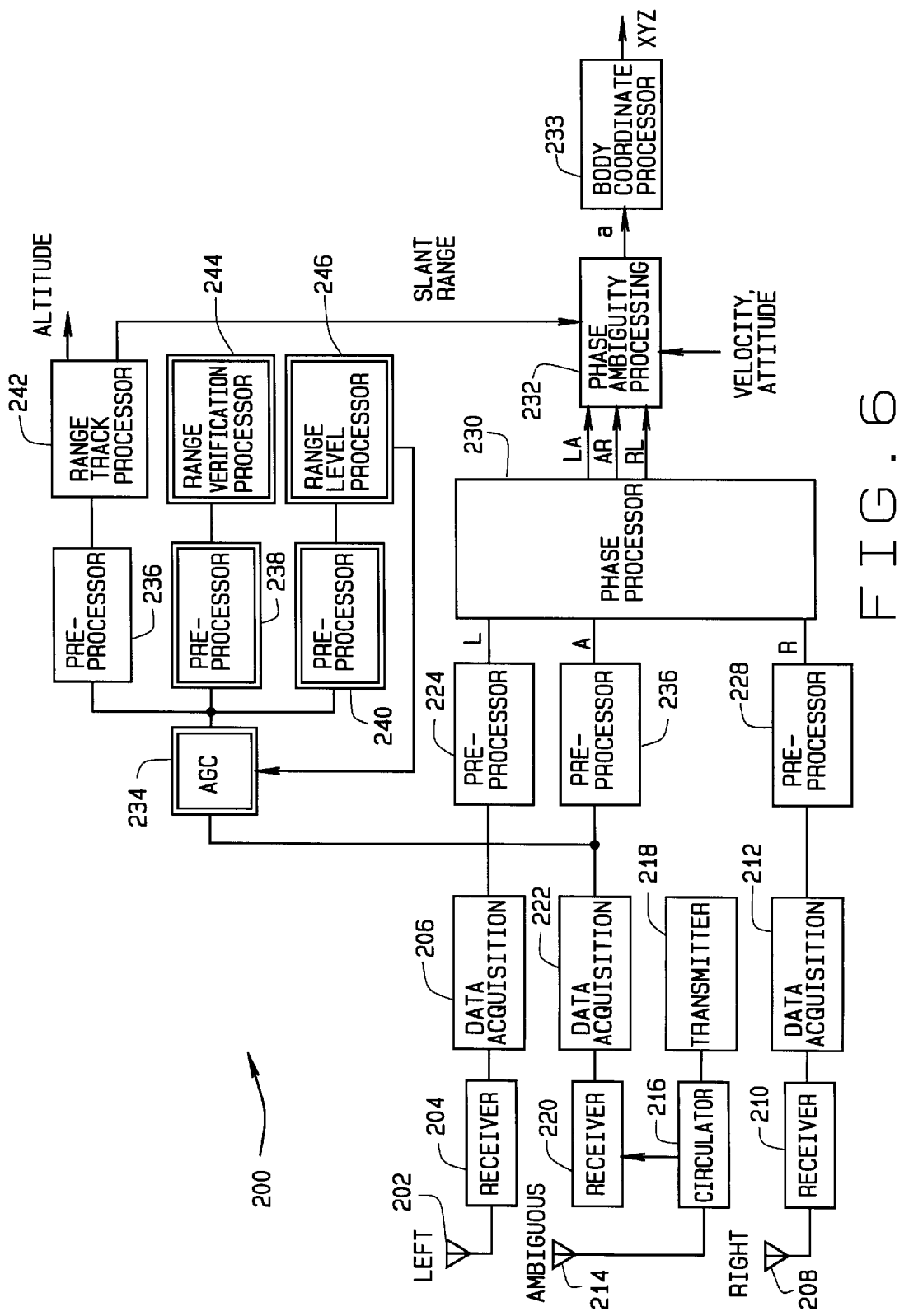
FIG. 6 is a block diagram of a radar signal processing system.

FIG. 6 is one embodiment of a doppler radar processing system 200. System 200 incorporates three radar antennas which receive reflected radar pulses, the pulses having originated from a radar source. A left antenna 202 receives the pulses and forwards the electrical signal to receiver 204. Receiver 204 forwards the received radar signal to a data acquisition unit 206. A right antenna 208 receives the pulses, at a slightly different time than left antenna 202, and forwards the electrical signal to receiver 210. Receiver 210 forwards the received radar signal to a data acquisition unit 212. An ambiguity antenna 214 also receives the reflected radar signal, and passes the received signal to a circulator 216. Circulator 216 functions to direct the transmit signal to the antenna, and to direct the received signal from the antenna to receiver 220, thereby allowing a single antenna to be used for both transmitting and receiving. Receiver 220 forwards the received signal to a data acquisition unit 222.

Data acquisition unit 206 provides a digital signal representative of the signal received at left antenna 202 to a left phase pre-processing unit 224. Similarly, representative signals are received at pre-processing units 226 and 228 from data acquisition units 222 and 212, respectively. Data acquisition units 206, 212, and 222 are configured, in one embodiment, to sample received signals, and thereby reduce the data to a rate which allows a relatively low speed computer to process digitized radar data. In one embodiment, pre-processing units 224, 226, and 228 perform a gate ranging function.

A phase processor 230 receives gated, filtered signals, representative of left, right, and ambiguity signals received at the antennas, and determines a phase relationship between each of the left and ambiguous signal, the right and ambiguous signals, and the right and left signals. The phase relationships between the signals are used, along with slant range, velocity and attitude readings in a phase ambiguity processing unit 232 to determine an interferometric angle to a target. A body coordinate processor 233 utilizes the interferometric angle to determine an XYZ position of, for example, an aircraft employing system 200 with respect to a current aircraft position, sometimes referred to herein as aircraft body coordinates.

A signal from data acquisition unit 222 is also received at an automatic gain control (AGC) unit 234. A signal from AGC unit 234 is passed to pre-processing units 236, 238, and 240. A filtered signal from pre-processing unit 236 is passed to range track processor 242 which provides a slant range signal to phase ambiguity processing unit 232 and altitude information. Pre-processing unit 238 passes a filtered signal to a range verification processor 244. Pre-processing unit 240 passes a filtered signal to a range level processor 246, which also provides a feedback signal to AGC 234.

Doppler radar processing system 200, in at least one application, is configured to provide an alternative to global positioning systems (GPS). It is known that at least some of the known GPS systems can be jammed, thereby rendering such a system useless for navigation and accurate determination of position. However, GPS systems are noted for accuracy. In order to provide a radar replacement for GPS, an accuracy of such a radar system, for example, system 200, must be tested.

Known methods of testing a radar system installation have traditionally included making a flight test and analyzing radar performance based on data recorded or observed during the flight test. After the flight, adjustments are made to the radar and the flight test and analysis are repeated. Analysis, adjustments, and flight tests are repeated until the radar system installation is considered to be optimized. However, flight testing is expensive, and repeated flight tests are not only prohibitively expensive, but further considered to be somewhat inefficient.

Figure 7:
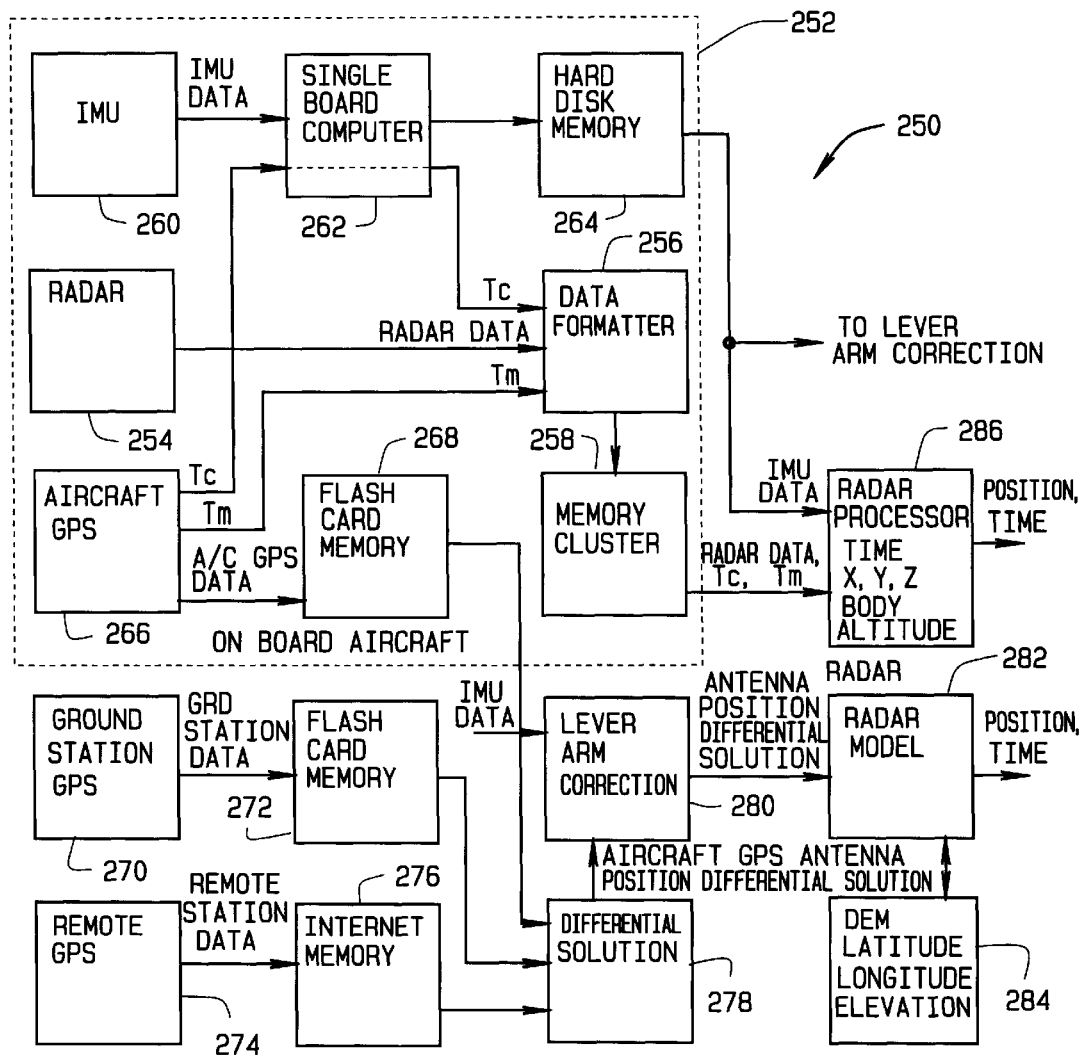
FIG. 7 is a block diagram of a test configuration for the collection and analysis of radar data, and data from other sensor systems.

FIG. 7 is a block diagram of a radar data recording and processing system 250 for the collection and analysis of radar data, and data from other sensor systems. The data collected from a single flight is used to perform an analysis, and a single adjustment is performed on the radar system to provide a performance considered to be optimized and equivalent or better to that of a GPS system. Radar data recording and processing system 250 includes aircraft based equipment 252 and other ground based equipment as is described below. Referring to aircraft based equipment 252, radar 254 (similar or equivalent to radar system 200 described in FIG. 6) provides unprocessed radar data to a data formatter 256. Data formatter 256 is configured to digitize samples of radar data, and in one embodiment, data formatter 256 is configured to digitize samples from three radar channels at a time at a rate of 100 MHz. In a particular embodiment, 25% of all radar data samples are recorded into memory cluster 258, in order to keep bandwidth at a low enough rate to record. Sampled data is formatted by data formatter 256 into 32 bit words and split into output channels for recording.

In one embodiment, an inertial measurement unit (IMU) 260 provides aircraft velocity, time, and attitude (pitch, roll, and yaw) data to a computer 262 which formats the velocity, time, and attitude data from IMU 260 for storage in hard disk memory 264. Computer 262 also receives as input a timing count signal from an aircraft GPS 266, which is utilized to time synchronize the IMU data with GPS data. In addition to IMU 260, other data sources are contemplated to provide data to computer 262 for storage in hard disk memory 264. In addition, these other data sources (not shown) may provide flight data to be synchronized, formatted and stored utilizing computers and memory similar to, but separate from, computer 262 and memory 264. Examples of other data sources include, but are not limited to, flight video recorders, oscilloscope readings of electrical signals, air data recorders or any other type of flight data source or data source which can provide data that is to be synchronized with data from radar 254.

In addition, aircraft equipment 252 includes an aircraft GPS 266, which is configured to provide position (latitude, longitude, and altitude) and time data as received at an aircraft GPS antenna. In one embodiment, position and time are provided at a 0.1 second rate. GPS 266 further provides timing mark signals, one directly to data formatter 256, and another through computer 262, which serve to time synchronize data from radar 254, and data from IMU 260. Data from GPS 266 is stored in a memory 268.

For proper analysis, the radar data that is formatted and stored has to be time synchronized with data from IMU 260 and data from GPS 266. To accommodate this time synchronization, data formatter 256 is configured to generate control words that are also formatted and placed in a data stream along with the radar data for storage in memory 258. Further, GPS 266 outputs a one pulse per second discrete timing mark signal and a timing count signal of each timing mark, which are used in control word generation. As stated above, data formatter 256 receives these signals and generates control words for the signals at the time the signals occur within the data stream. Before the next one second mark, radar data is written to formatter 256 through a software interface to generate control words indicating what the time was at the last time mark. The two timing signals allow a determination of the exact time of each data point in the stored data stream. In a specific embodiment, data formatter 256 and memory 258 are capable of recording radar data at up to 92 MB per second through utilization of a data port.

After flight testing, the stored data in memories 264, 258, and 268 are analyzed, for example, using ground based computers. In one embodiment, data from GPS 266, is considered to be accurate to about 15 meters. To improve accuracy, data from a ground GPS 270 is collected and stored in a memory 272. In one embodiment, data from ground GPS 270 includes position and time data from the ground station at a 0.1 second data rate. In addition a remote GPS 274 is accessed, in one embodiment, through the internet 276 to provide position and time information from a remote station, at a 15 second data rate. Data from all three GPS systems, aircraft GPS 266, ground station GPS 270, and remote GPS 274 is applied to a differential solution unit 278 which is able to generate a "true" GPS position, of the aircraft GPS antenna. In one embodiment, differential solution unit 278 is configured such that GPS antenna position is determined with an accuracy of about 2 to 5 centimeters.

Radar measurements are made using one or more radar antennas. However, to verify radar performance, radar measurements sometimes referred to herein as radar data or radar flight test data, are compared to data from a radar model. The radar model data is generated by "flying" the model across a digital elevation map (DEM). The radar model simulates the performance of the actual radar, for example, radar system 200. Thus, aircraft attitude derived during flight test from IMU 260 and stored in memory 264 are inputs to a radar model (described below) allowing the model to alter its performance, for example, for a recorded roll maneuver, in the same manner as the actual radar did during the actual roll maneuver.

The flight test recorded GPS position data is used to guide the model across the DEM following the same path as during flight test. IMU 260 and other aircraft sensors and devices are generally located on an aircraft some distance from the radar antennas. To accurately analyze radar performance, using data from other systems, for example, GPS 266, a correction unit 280 is configured to adjust GPS measurements as if a position of the GPS antenna was located at a position equivalent to that of the radar antenna, based upon physical measurements of the separation between the radar antenna and the GPS antenna. Similar adjustments are made for measurement data from other sensors. In the embodiment shown in FIG. 7, IMU data from memory 264 is also received at correction unit 280, which is configured to adjust IMU measured data based on a physical distance between IMU 260 and the antenna for radar 254.

Corrected sensor data, that is, sensor data which has been adjusted based on distances from the radar antenna, are utilized to provide a corrected GPS position and corrected IMU attitude as inputs to a radar model 282 which "flys" across digital elevation map 284 data. Radar model 282 provides an accurate simulation of radar performance and data during the flight, based at least upon pitch, roll, and yaw as measured during the flight. Radar model 282, which simulates radar performance during flight test, is effectively flown across the digital elevation map over the same exact path taken during the flight test by following the recorded GPS path across the map. Radar model 282 thus provides a simulated radar data file which can be compared or correlated with recorded radar data. The data provided by the DEM and radar model 282, along with recorded GPS inputs forms a "truthing" system for verification of radar system performance. A radar processor 286 is configured to utilize the radar data stored in memory 258, including the time synchronization data, along with IMU data from memory 264 to produce a radar file which includes time, a measured position in X, Y, and Z body coordinates, and altitude. The radar file is compared with simulated data generated by radar model 282, which for example, corrects for turbulence encountered during the flight. The comparison of the radar file to the data from radar model 282 provides a verification of radar system performance.

Figure 8:
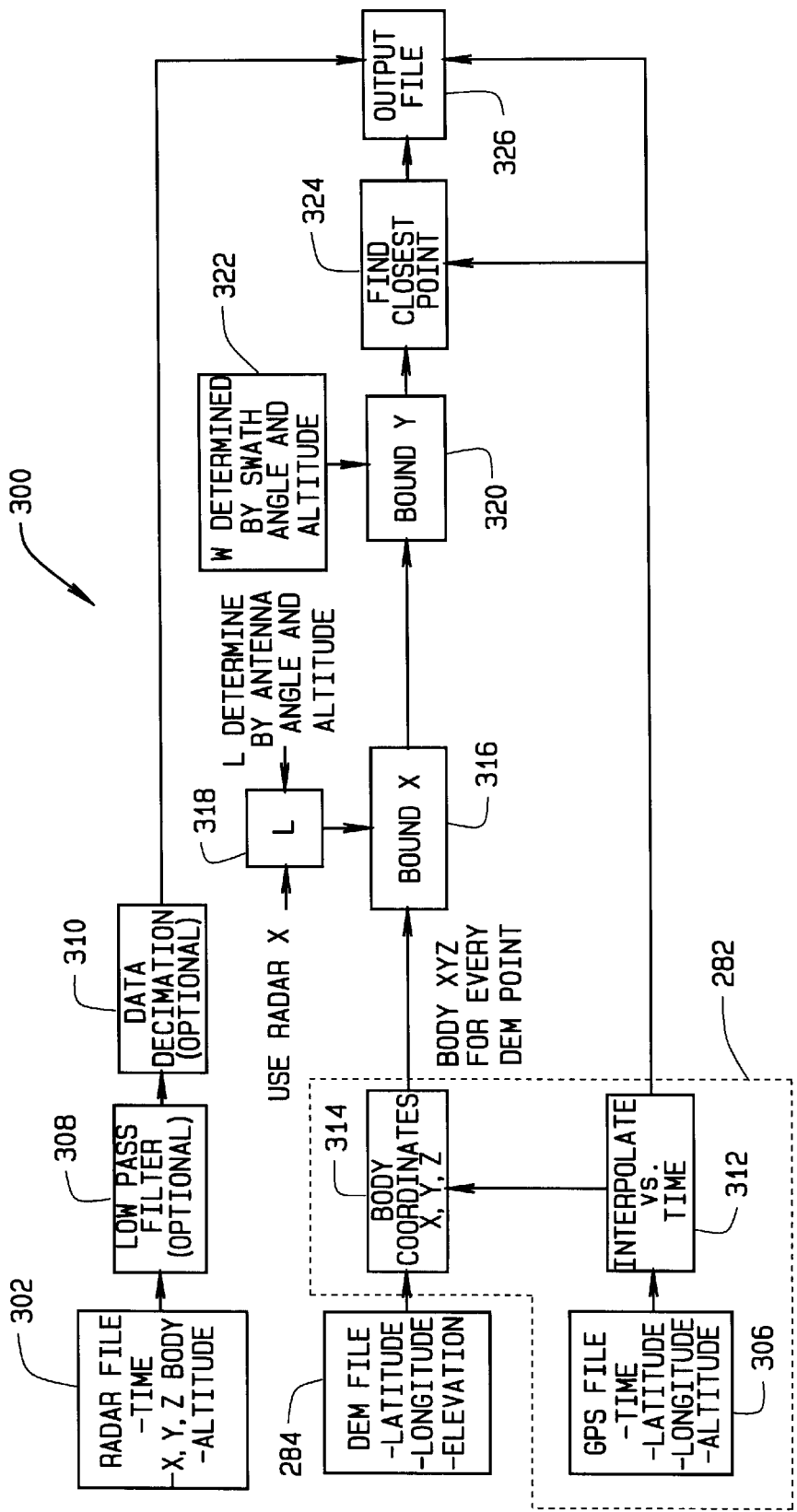
FIG. 8 is a diagram illustrating analysis of collected radar data utilizing digital elevation map (DEM) data and global positioning satellite (GPS) data.

FIG. 8 is a flow diagram 300 illustrating a method for determining an accuracy of a radar system using collected radar flight test data and radar model data as described above in FIG. 7. Such a method is sometimes referred to herein as a map correlation algorithm. In one embodiment, the map correlator algorithm requires three files. A radar data file 302 is stored in a memory of a computer (neither shown) and is created based on measurements made by the above described radar system 200 (shown in FIG. 6) and collected using test configuration 250 (shown in FIG. 7). Radar data file 302 includes radar data test points which are time stamped X, Y, and Z body coordinates and an altitude. The radar data test points, as further described below, are compared to an X, Y, Z, and altitude generated by radar model 282 as it processes elements of a digital elevation map (DEM) file 284 along the path based on recorded GPS position data and recorded IMU attitude data. The X, Y, and Z body coordinates stored in radar data file 302 are the calculated body coordinates based on radar returns received by, for example, radar 200 at specific points in time.

Digital elevation map (DEM) 284 (also shown in FIG. 7) is a map that is typically supplied by another party. One such example is a map supplied through a government agency that gives latitude, longitude, and elevation values for a section of terrain. The DEM is basically broken into small grids which allows a user to find a highest point within a section of the terrain.

GPS file 306 is a file generated using GPS data collected during a flight test, the flight test also being when the radar data is collected. GPS file 306 may further include differential GPS information (as above described with respect to FIG. 7). GPS file 306 typically includes a time stamped latitude, longitude, and elevation. In known GPS systems, data is collected at a rate which is less than a rate of data collection by radar systems, and therefore radar data file 302 will typically have a larger number of data points than GPS file 306. To compensate, GPS file 306 is subjected to an interpolation, as described below.

In one embodiment, radar data file 302 is processed utilizing an optional low pass filter 308 to reduce noise and a data decimation unit 310 to reduce processing time. In alternative embodiments, radar data file 302 is processed utilizing one or the other of low pass filter 308 and data decimation unit 310. In a further alternative embodiment, there is no processing of radar file 302. In the embodiments which utilize low pass filter 308, the filter will tend to smooth the data within file 302. In the embodiments which utilize decimation unit 310, a size of the comparison is reduced. A reduction in comparison size is typically done to reduce processing speed requirements. Since in certain embodiments, elements of radar data file 302 are at a smaller time resolution than the elements within GPS file 306. In other words there are more samples in radar data file 302 than in GPS file 306. To compensate, the GPS data is interpolated 312 between each data point, to generate a same quantity of data points as is present in radar data file 302. In one embodiment, a straight line fit interpolation is used to generate the additional data points in GPS file 306, so that the number of elements, or data points within the two files (302 and 306) is equivalent. After the interpolation, for every time that a radar data point is available there will be a corresponding GPS point. DEM file 284 is typically acceptable as is and therefore requires no interpolation or other processing.

Results of the interpolation 312 to generate the additional data points within GPS file 306 are used to generate 314 a body coordinate X, Y, and Z value for every data point in DEM file 284. In other words, DEM file 284 is transformed such that its coordinate system is moved to the coordinate system of the aircraft. GPS file 306, interpolation 312, and generated body coordinates make up at least a portion of radar model 282 (also shown in FIG. 7.

Once all the DEM points have been transformed to body coordinates, a bounding box is applied 316, around at least a portion of the transformed DEM data, thereby decreasing a number of points to check against radar data file 302. Utilization of a bounding box prevents comparisons to DEM points that are not within the flight path of the radar and decreases the time the map correlation algorithm takes to execute. In one embodiment, X is a body coordinate value from radar data file 302 which is bounded by a value L, which is calculated by either using the body coordinate X value from radar data file 302 as a limit or by using a combination of antenna angle and altitude. A Y body coordinate value bounding is also applied 320 which has a value of W, which is a swath width value. The swath width value is calculated utilizing a swath angle and an altitude corresponding to an antenna beam width bounds of the radar system under test.

Once the bounding is completed, the result is a collection of DEM data points to be matched with GPS data points. The DEM data point which is closest to a current GPS point is determined 324 within the bounding box. The closest point is an X, Y, and Z body coordinate value which is compared 326 against radar data file 302 at each given time. The comparison 326 is stored in an output file, which further provides a correlation showing how well the radar was performing against a reference point. In such an embodiment, DEM file 284 is considered to be a measured "truth". In a specific embodiment, the procedure is repeated for every point in time in radar file 302. The values stored in the output file allow a plot of the Radar X, Y, and Z against a closest point X, Y, and Z, from DEM file 284 for verification of accurate performance by radar system 200.

Figure 9:
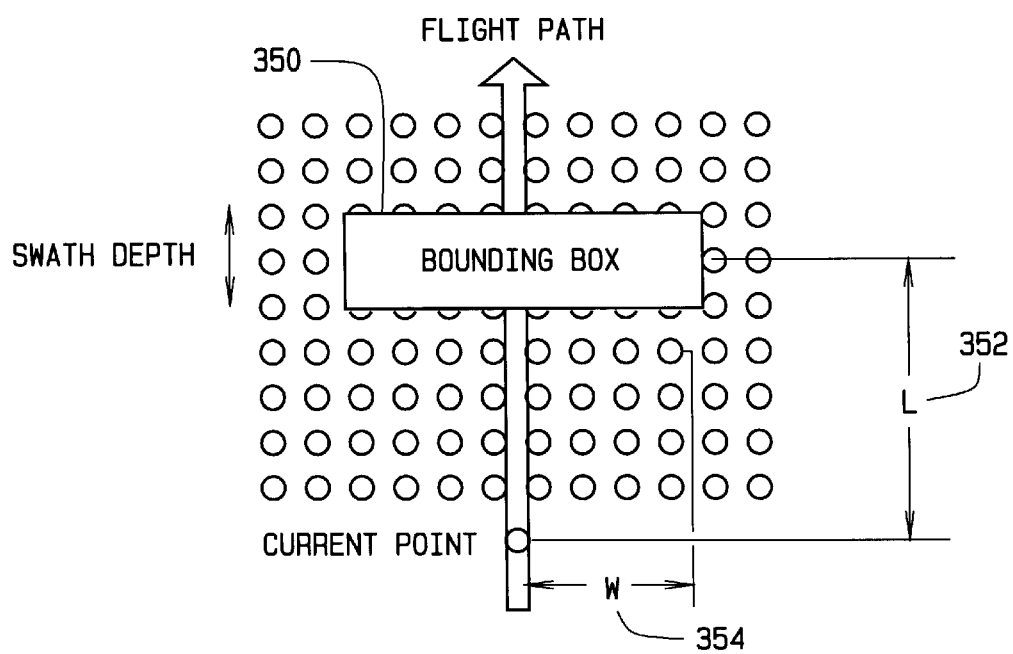
FIG. 9 is a diagram illustrating bounding of DEM data for comparison to collected radar data.

FIG. 9 illustrates a bounding box 350 which is utilized to implement the above described process. An X body coordinate bounding 352 of L and a Y body coordinate bounding 354 of W from a current GPS data point 356 are shown In alternative embodiments, and dependent of processing capabilities, the processes and apparatus described in flow diagram 300, may be implemented on an aircraft, such the correlation is accomplished real time. In addition, post flight implementation is also contemplated, which serves as a proving out ground for radar system 200 of FIG. 7.

The radar system 200, radar data collection 250, and radar data processing methods 300 and apparatus above described provides and verifies performance of a non-jammable alternative to known global positioning systems. Further, the above described processing allows a verification of radar system performance against highly accurate DEM mapping and GPS data, based upon high speed collection of real radar data. The high speed data collection provides for off line processing of real radar data, off line, using a computer, without the disadvantages of repeated flight tests to adjust radar performance. Further the data collection and processing techniques are applicable to radar platforms other than the above described radar system 200. For example, the above described data collection and processing may be utilized to verify performance of radar altimeters, which are but one example.

In addition, using digital signal processing techniques, the radar system is able to perform faster and more accurate airborne processing than known radar ambiguity solutions.

While the invention has been described in terms of various specific embodiments, those skilled in the art will recognize that the invention can be practiced with modification within the spirit and scope of the claims.

What is claimed is:

1. A method for testing a radar system utilizing radar data samples taken during a flight test and global positioning satellite (GPS) data samples received by an aircraft GPS system during the flight test, the aircraft GPS system providing a timing signal, said method comprising:
   synchronizing the radar data samples with the GPS data samples utilizing the timing signal;
   storing at least a portion of the synchronized radar data samples;
   storing the GPS data samples;
   generating radar model data from the GPS data samples; and
   comparing the radar model data to the stored radar data samples.

2. A method according to claim 1 wherein synchronizing the radar data samples further comprises digitizing the radar data samples.

3. A method according to claim 2 wherein storing at least a portion of the synchronized radar data samples comprises storing about 25% of the digitized radar data samples.

4. A method according to claim 1 wherein storing GPS data samples comprises storing GPS data samples from at least one of an aircraft GPS system, a ground station GPS system, and a remote station GPS system.

5. A method according to claim 1 wherein generating radar model data from the stored GPS data samples comprises:
   measuring a physical separation between the aircraft GPS antenna and a radar antenna; and
   adjusting data within the GPS data samples from a correspondence with a GPS antenna position to a correspondence with a position of the radar antenna.

6. A method according to claim 1 further comprising synchronizing the radar data samples with at least one of data samples from an inertial measurement unit (IMU), data samples from a flight video recorder, data samples from an air data recorder, and data samples from an electrical signal monitor.

7. A method according to claim 1 further comprising:
   storing data samples from an inertial measurement unit (IMU) in a memory; and
   adjusting data within the IMU data samples from a correspondence with an IMU position to a correspondence with a position of the radar antenna.

8. A method according to claim 1 wherein synchronizing the radar data samples comprises inputting the radar data samples, the GPS data samples, and the timing mark signal into a data formatter.

9. A method according to claim 8 wherein synchronizing the radar data samples further comprises:
   generating control words within the data formatter;
   formatting the control words; and
   placing the formatted control words in a data stream along with the digitized radar data samples, the data formatter outputting the data stream.

10. A method according to claim 9 wherein generating control words comprises generating control words which indicate a time for each of the digitized radar data samples.

11. A method according to claim 9 wherein said step of storing at least a portion of the synchronized radar data samples comprises storing the data stream in a memory.

12. A radar data recording and processing system comprising:
an aircraft global positioning satellite (GPS) system configured to provide GPS data samples and to generate at least one timing signal;
a memory device; and
a data formatter configured to digitize samples of radar data received from a radar, synchronize the digitized radar data samples with the GPS data samples from said aircraft GPS system using the at least one timing signal, generate control words relating to the digitized radar data samples based on the at least one timing signal, and place the controls words and radar data samples in a data stream for storage in said memory device.

13. A radar data recording and processing system according to claim 12 further comprising a second memory device, said second memory device configured to receive and store data samples from said aircraft GPS system.

14. A radar data recording and processing system according to claim 12 further comprising:
an inertial measurement unit (IMU);
a computer, said computer configured to receive IMU data samples and the at least one timing signal from said GPS system, said computer further configured to synchronize the IMU data samples with the at least one timing signal; and
a third memory device, said third memory device configured to receive the synchronized IMU data samples from said computer.

15. A radar data recording and processing system according to claim 14 further comprising:
a ground station GPS system;
a remote station GPS system; and
a differential solution unit, said differential solution unit configured to receive aircraft GPS data samples, ground station GPS data samples, and remote unit GPS data samples, said unit configured to determine a physical position of an aircraft GPS system antenna when each aircraft GPS data sample was received.

16. A radar data recording and processing system according to claim 15 wherein said differential solution unit is configured to determine a physical position of the aircraft GPS system antenna within about 2 to 5 centimeters.

17. A radar data recording and processing system according to claim 15 further comprising a correction unit, said correction unit configured to adjust data within the GPS data samples from said differential solution unit, the data corresponding to the physical position of the aircraft GPS system antenna, to correspond to a physical position of an aircraft radar antenna.

18. A radar data recording and processing system according to claim 17 wherein said correction unit is configured to adjust data within the synchronized IMU data samples from said third memory device, the data corresponding to the physical position of said IMU, to correspond to a physical position of the aircraft radar antenna.

19. A radar data recording and processing system according to claim 18 said system configured to determine radar antenna positions throughout a flight based upon the adjusted IMU data samples from said correction unit and the adjusted aircraft GPS data samples from said correction unit.

* * * * *

UNITED STATES PATENT AND TRADEMARK OFFICE
CERTIFICATE OF CORRECTION

PATENT NO. : 6,744,401 B2
DATED : June 1, 2004
INVENTOR(S) : Hager et al.

It is certified that error appears in the above-identified patent and that said Letters Patent is hereby corrected as shown below:

Column 11,
Line 14, delete "controls" and insert -- control --.

Signed and Sealed this

Twenty-eighth Day of March, 2006

JON W. DUDAS
*Director of the United States Patent and Trademark Office*